(12) United States Patent
Daga et al.

(10) Patent No.: US 12,271,315 B2
(45) Date of Patent: *Apr. 8, 2025

(54) MULTI-VALUE MAPPING FOR OBJECT STORE

(71) Applicant: Samsung Electronics Co., Ltd., Suwon-si (KR)

(72) Inventors: Vinod Kumar Daga, Santa Clara, CA (US); Vamsikrishna Sadhu, Santa Clara, CA (US); Angel Benedicto Aviles, Jr., San Jose, CA (US); Vijaya Kumar Jakkula, San Jose, CA (US); Venkata Bhanu Prakash Gollapudi, Pleasanton, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 75 days.

This patent is subject to a terminal disclaimer.

(21) Appl. No.: 17/744,617

(22) Filed: May 13, 2022

(65) Prior Publication Data

US 2022/0269612 A1    Aug. 25, 2022

Related U.S. Application Data

(63) Continuation of application No. 16/879,749, filed on May 20, 2020, now Pat. No. 11,334,490.

(Continued)

(51) Int. Cl.
*G06F 12/0873* (2016.01)
*G06F 12/06* (2006.01)
(Continued)

(52) U.S. Cl.
CPC ...... *G06F 12/0873* (2013.01); *G06F 12/0692* (2013.01); *G06F 12/0882* (2013.01);
(Continued)

(58) Field of Classification Search
CPC ............ G06F 12/0692; G06F 12/0873; G06F 12/0882; G06F 16/148; G06F 16/156; G06F 16/2246
(Continued)

(56) References Cited

U.S. PATENT DOCUMENTS 8,433,849 B2    4/2013  Schrijver et al.
9,436,596 B2    9/2016  Sengupta et al.
(Continued)

OTHER PUBLICATIONS

Gupta, A., Pisolkar, R., Urgaonkar, B., & Sivasubramaniam, A. (2011). Leveraging Value Locality in Optimizing {NAND} Flash-based {SSDs}. In 9th USENIX Conference on File and Storage Technologies (FAST 11). (Year: 2011).*
(Continued)

*Primary Examiner* — Reginald G Bragdon
*Assistant Examiner* — Aaron D Ho
(74) *Attorney, Agent, or Firm* — Renaissance IP Law Group LLP

(57) ABSTRACT

A method for mapping an object store may include storing a data entry within a mapping page for an object in the object store, wherein the data entry may include a key and a value, and the value may include an address for the object in the object store. The method may further include storing multiple data entries within the mapping page for multiple corresponding objects in the object store, wherein each data entry may include a key and one or more values for a corresponding object in the object store, and each value may include an address for the corresponding object in the object store. The data entries may be part of a mapping data structure which may include nodes, and each node may be stored within a mapping page.

20 Claims, 7 Drawing Sheets

Related U.S. Application Data

(60) Provisional application No. 62/958,303, filed on Jan. 7, 2020.

(51) Int. Cl.
*G06F 12/0882* (2016.01)
*G06F 16/14* (2019.01)
*G06F 16/22* (2019.01)

(52) U.S. Cl.
CPC .......... *G06F 16/148* (2019.01); *G06F 16/156* (2019.01); *G06F 16/2246* (2019.01)

(58) Field of Classification Search
USPC ........................................................ 711/206
See application file for complete search history.

(56) References Cited

U.S. PATENT DOCUMENTS

| | | | |
|---|---|---|---|
| 9,639,564 B2 | 5/2017 | Isherwood et al. | |
| 9,760,502 B2 | 9/2017 | Raam | |
| 11,461,492 B1* | 10/2022 | Lloyd | G06F 16/9035 |
| 2005/0149472 A1 | 7/2005 | Schreter | |
| 2007/0150647 A1* | 6/2007 | Shin | G06F 12/0866 |
| | | | 711/E12.019 |
| 2010/0287015 A1* | 11/2010 | Au | G06Q 10/063 |
| | | | 705/7.11 |
| 2010/0332730 A1* | 12/2010 | Royer, Jr. | G06F 12/0246 |
| | | | 711/E12.008 |
| 2013/0339567 A1 | 12/2013 | Carpentier et al. | |
| 2014/0214897 A1 | 7/2014 | Zhu et al. | |
| 2016/0099810 A1* | 4/2016 | Li | H04L 9/3242 |
| | | | 713/193 |
| 2016/0191508 A1 | 6/2016 | Bestler et al. | |
| 2016/0335293 A1* | 11/2016 | Teodorescu | G06F 16/113 |
| 2019/0034427 A1* | 1/2019 | Trika | G06F 16/21 |
| 2021/0034543 A1 | 2/2021 | Shveidel et al. | |
| 2021/0200833 A1* | 7/2021 | Sharma | G06F 16/9035 |

OTHER PUBLICATIONS

Notice of Allowance for U.S. Appl. No. 16/879,749, mailed Jan. 20, 2022.
Office Action for U.S. Appl. No. 16/879,749, mailed Sep. 15, 2021.
Zhang, Huanchen, "Towards Space-Efficient High-Performance In-Memory Search Structures", Thesis Proposal, Apr. 17, 2018, School of Computer Science Carnegie Mellon University Pittsburgh, PA 15213.

* cited by examiner

MULTI-VALUE MAPPING FOR OBJECT STORE

REFERENCE TO RELATED APPLICATIONS

This application is a continuation of U.S. patent application Ser. No. 16/879,749 filed May 20, 2020 which is incorporated by reference and which claims priority to, and the benefit of, U.S. Provisional Patent Application Ser. No. 62/958,303 titled "Apparatus and Method to Provide Persistent Multi-Value Mapping Services" filed Jan. 7, 2020 which is incorporated by reference.

BACKGROUND

1. Field

This disclosure relates generally to object stores, and more specifically to methods and apparatus for mapping an object store.

2. Related Art

An object based storage system may include a mapping layer or service that maintains a mapping data structure to map objects to physical locations in storage. The mapping data structure may include addresses for the physical locations at which the objects, including multi-valued objects, may be stored.

SUMMARY

A method for mapping an object store may include storing a data entry within a mapping page for an object in the object store, wherein the data entry may include a key and a value, and the value may include an address for the object in the object store. The value may be a first value, and the address may be a first address, the object in the object store may include a multi-value object, and the data entry within the mapping page may include a second value, the second value including a second address for the object in the object store. The mapping page may be stored in persistent storage. The mapping page may be maintained in volatile memory during a run-time. The data entry may be a first data entry, the object may be a first object, the method may further include storing a second data entry within the mapping page for a second object in the object store, the second data entry may include a key and one or more values for the second object in the object store, and the one or more values for the second object may include one or more addresses in the object store. The keys may be stored in contiguous locations in a first region of the mapping page, and the values may be stored in contiguous locations in a second region of the mapping page. The method may further include storing multiple data entries within the mapping page for multiple corresponding objects in the object store, wherein each data entry may include a key and one or more values for a corresponding object in the object store, and each value may include an address for the corresponding object in the object store. At least two of the keys may be stored in contiguous locations in a first region of the mapping page, and at least two of the values may be stored in contiguous locations in a second region of the mapping page. The first and second regions may be arranged to advance in opposite logical directions within the mapping page as keys and values are added to the mapping page.

The data entries may be part of a mapping data structure. The mapping data structure may include nodes, and each node may be stored within a mapping page. A first one of the nodes may include a data node, and the data node may include data entries for objects in the object store. A second one of the nodes may include an index node, the index node may include an index entry, and the index entry may include a key and a value, wherein the value of the index entry may point to the data node. The index node may be a first index node, and the index entry may be a first index entry, a third one of the nodes may include a second index node, the second index node may include a second index entry, and the second index entry may include a key and a value, wherein the value of the second index entry may point to the first index node. A first one of the nodes may include a hybrid node, and the hybrid node may include a data entry for a corresponding object in the object store. The hybrid node may include an index entry, and the index entry may include a key and a value, wherein the value of the index entry may point to a second one of the nodes. The method may further include traversing the mapping data structure to access a data entry for a corresponding object in the object store.

A method for mapping an object store may include maintaining a mapping data structure comprising key-value entries, wherein a first one of the key-value entries may include a data entry including a key and a value, the value comprising an address for an object in the object store, and the data entry may be stored within a mapping page. The mapping data structure may include a tree structure having nodes, and each node may be stored within a mapping page. A second one of the key value entries may include an index entry including a key and a value, the value pointing to the mapping page in which the data entry is stored.

A mapping system for an object store may include a processor configured to store a data entry within a mapping page in persistent storage for an object in the object store, wherein the data entry may include a key and a value, and the value may include an address for the object in the object store. The system may further include a paging manager configured to manage the mapping page.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

A mapping data structure for an object store according to this disclosure may maintain a mapping data structure to map objects to physical locations in persistent storage such as storage class memory like persistent memory (PMEM), a non-volatile dual in-line memory module (NVDIMM), and/or cross-gridded memory with bulk resistance change, as well as hard disk drives (HDDs), solid state drives (SSDs), any cloud data storage instances (including highly available cloud data storage instances), any cloud databases, and/or the like. A mapping data structure may itself be stored in persistent storage, for example, to preserve an application's data and/or state across power cycles. A mapping data structure for an object store according to this disclosure may be updated to reflect changes to the objects in storage. For example, the mapping data structure may be updated if an additional value for a key is added to an object, e.g., to implement object versioning. The mapping data structure may also be updated if data is appended to an object, or if a new object is added to the object store. However, for a mapping data structure stored in persistent storage, making changes to the data structure may result in random reads and/or writes to the data structure. This may cause read and/or write amplification in a storage drive on which the mapping data structure is stored. Read and/or write amplification may reduce the lifespan, reliability, and/or performance of a storage drive. Moreover, a storage drive may not be performant for random read and/or write workloads, and therefore, accessing a mapping data structure in persistent storage may negatively impact the latency of input/output (I/O) operations for the object store.

Some of the principles of this disclosure relate to techniques for implementing mapping data structures for object stores in which an entry may have a key and one or more values that are stored on the same page, for example in persistent storage. Storing a key and one or more values on the same page may, for example, reduce read and/or write amplification and/or improve I/O latencies and/or performance.

Some additional principles of this disclosure relate to the use of one or more performant data structures to implement efficient indexing and/or traversal of the data structure, the use of mapping page layouts that may be favorable for applications and/or storage devices, the use of mapping pages that may be stored in persistent storage and also loaded in volatile memory during run-time, and/or other techniques as described in more detail below.

Figure 1:
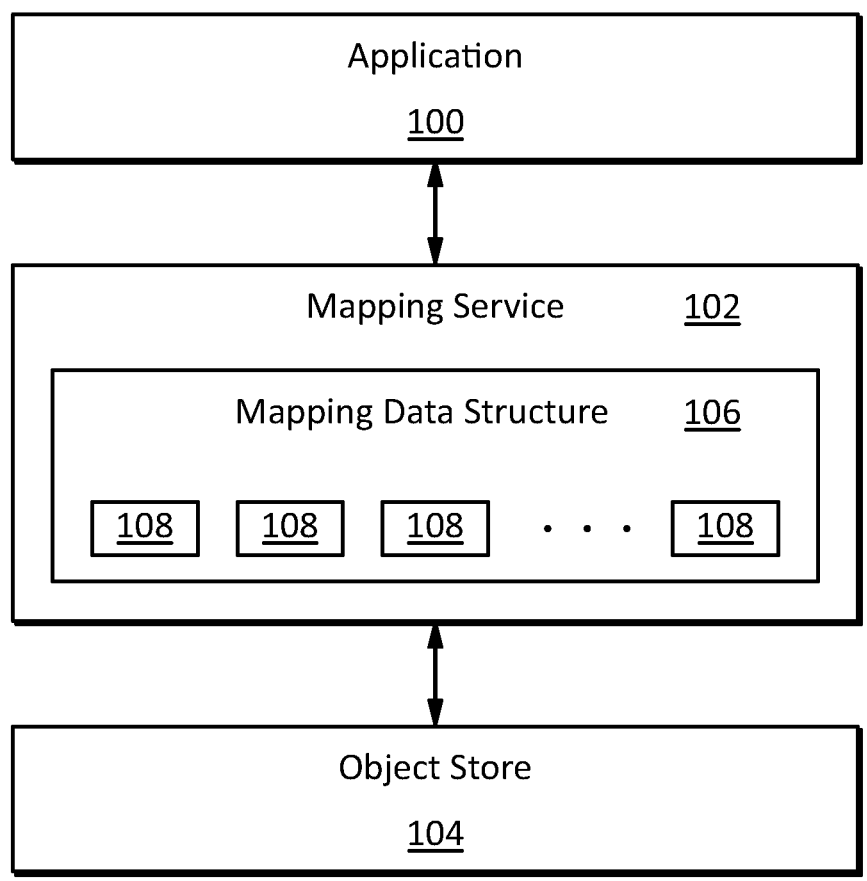
FIG. 1 illustrates an embodiment of a system and method for mapping an object store according to this disclosure.

FIG. 1 illustrates an embodiment of a system and method for mapping an object store according to this disclosure. The embodiment illustrated in FIG. 1 may include an application layer 100, a mapping service or layer 102, and an object store 104. The application layer 100 may include anything that may use the mapping service 102 to map objects to the object store 104. Examples include applications, drivers, kernels, databases, file system, and/or the like, which may be referred to collectively as applications. The object store 100 may be implemented in any form including individual object based storage devices such as key-value SSDs, an object storage platform that may implement an object storage layer on top of block storage devices, a distributed object storage system such as a storage area network (SAN) with object storage nodes (OSNs), a cloud based object storage service, and/or the like. In some other embodiments, the mapping service 102 may map objects to more than one object store 104. In yet other embodiments, multiple mapping services 102 may map objects to one or more object stores 104.

The mapping service 102 may include a mapping data structure 106 having entries 1108. Some embodiments may include different types of entries such as data entries, index entries, hybrid entries, and/or other types of entries. In some embodiments, each entry 108 may include, for example, a key and one or more values. A key may be implemented, for example, as an actual key, or a copy or replica of an actual key, of an object in the object store 104, as an object identifier (OID), as a hash of a key, and/or in any other manner. In a data entry, a value may include, for example, an address for an object in the object store 104. In a data entry for a multi-value object, multiple values may include, for example, multiple addresses for the object in the object store 104. As another example, in an index type of entry, a value may include a pointer to another entry 108 and/or collection of entries 108. As yet another example, a hybrid entry may include multiple values in which one or more of the values may include one or more addresses for an object in the object store, and one or more values may include one or more pointers to other entries and/or collections of entries.

In some embodiments, an entry 108 may be stored within a page of persistent storage as described above. In some embodiments, a page may refer, for example, to a page of flash memory in an SSD, and/or any block or other unit of persistent storage that may be accessed as a unit. Depending on the implementation details, maintaining the contents of an entry (e.g., a key and one or more values) within a single page may reduce random reads and/or writes and/or read and/or write amplification. In some embodiments, multiple entries may be stored in a page.

In some embodiments, the mapping data structure 106 may be implemented with one or more data structures such as hash tables, radix trees, B–trees, B+trees, and/or the like. Depending on the implementation details, the use of such data structures may, for example, provide efficient indexing techniques that may enable efficient or optimal traversals of the data structures to locate entries (e.g., keys and values) in the mapping data structure.

Some data structures, for example, tree structures, may include nodes or buckets. In some embodiments that use a mapping data structure with nodes or buckets (which may be referred to collectively as nodes), a node may include one or more entries. Moreover, a node may be stored within a page, and thus, any entries within the node may be stored within the same page. In some embodiments, each node may be stored within a dedicated page. In other embodiments, multiple nodes may be stored within a single page and/or a node may be spread over multiple pages. In some embodiments, a node may include entries of all or mostly one type. For example, nodes that may include all or mostly data entries, index entries, or hybrid entries may be referred to as data nodes, index nodes or hybrid nodes, respectively. In some embodiments, a page may include all or mostly one type of node and/or entry. For example, mapping pages that include all or mostly data, index or hybrid nodes and/or entries may be referred to as data, index and hybrid pages, respectively.

In some embodiments, all or one or more portions of a mapping data structure 106 may be maintained in volatile memory such as dynamic random access memory (DRAM) at various times. For example, the entire mapping data structure 106 may be stored in persistent storage to maintain an application's data and/or state across data and/or reset cycles. However, one or more portions of the mapping data structure 106 may be moved to, and/or replicated in, DRAM during a run time, for example, to provide faster access to the mapping data structure, and/or to reduce random reads and/or writes to and/or from persistent storage. The one or more portions of the mapping data structure 106 in DRAM may be copied or moved to persistent storage as part of a power-down or power loss process.

FIGS. 2 through 6 illustrate some example embodiments of methods and apparatus for mapping an object store according to some principles of this disclosure. For purposes of illustration, these embodiments may be described in the context of systems that may use a tree structure for a mapping data structure and nodes that may be implemented as pages in persistent memory. However, the inventive principles of this disclosure are not limited to these or any other implementation details.

Figure 2:
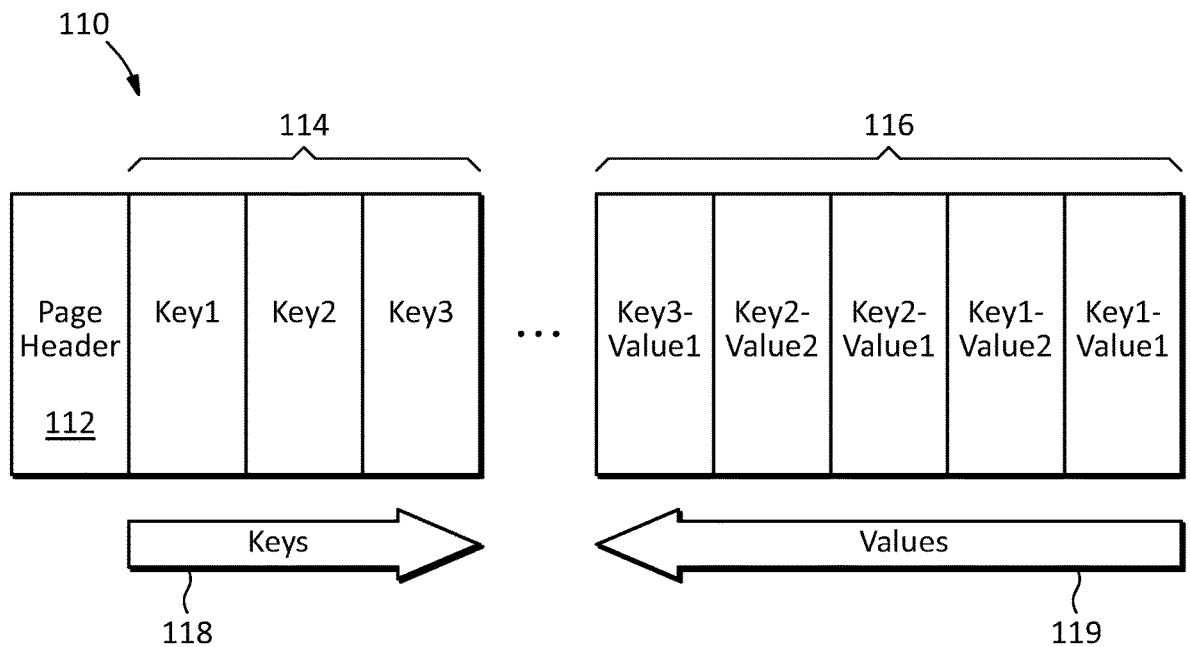
FIG. 2 illustrates an example embodiment of a data node according to this disclosure.

FIG. 2 illustrates an example embodiment of a data node according to this disclosure. In the embodiment illustrated in FIG. 2, the data node 110 may be implemented, for example, as a page in persistent storage. The data node 110 may also be maintained in volatile memory such as DRAM, for example, during a run-time. The data node 110 may be located at the end of a tree type of mapping data structure and thus it may also be referred to as a leaf node or leaf page.

The layout of the data node 110 may include a page header 112 which may include, for example, metadata about the page such as the page address on a storage device, the number of keys or entries in the page, the level of the page in the mapping data structure, and/or the like. The remainder of the page may be dedicated to data entries which may be single-value and/or multi-value entries. A first data entry may include a key Key1 and two corresponding values Key1-Value1 and Key1-Value2. A second data entry may include a key Key2 and two corresponding values Key2-Value1 and Key2-Value2. A third data entry may include a key Key3 and one corresponding value Key3-Value1. Thus, the data node 110 may implement a one-to-many mapping and/or a combination of one-to-one and one-to-many mapping.

Each data entry may correspond (map) to an object in an object store, and each value may store an address for the corresponding object. For multi-value entries, each of the multiple values may store, for example, an address relating to an object having a different version, appended data, and/or the like.

The entries may be arranged within the page such that keys may be stored in contiguous locations in a first region 114 of the page, and values may be stored in contiguous locations in a second region 116 of the page as illustrated in FIG. 2. The first and second regions 114 and 116 may be arranged such that, as keys and values are added to the page, they advance in opposite logical directions as shown by arrows 118 and 119, respectively. Depending on the implementation details, this layout of keys and values may enable efficient traversing of the entries within the page, for example with a tree search. In some embodiments, entries within the page may be traversed with a simple binary search, hashed indexing, and/or any other search technique.

Figure 3:
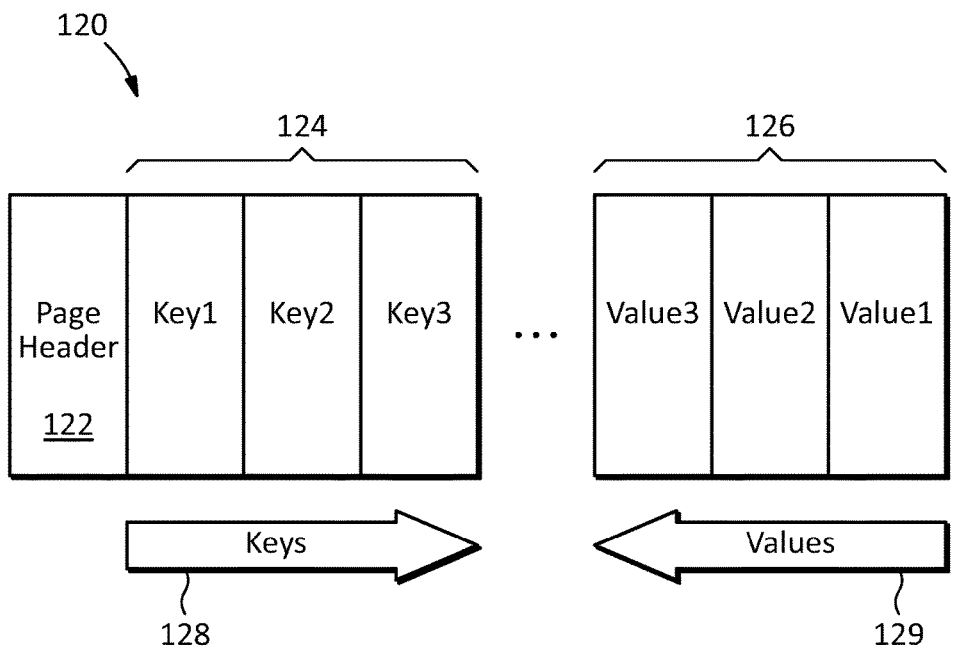
FIG. 3 illustrates an example embodiment of an index node according to this disclosure.

FIG. 3 illustrates an example embodiment of an index node according to this disclosure. In the embodiment illustrated in FIG. 3, the index node 120 may be implemented, for example, as a page in persistent storage. The index node 120 may also be maintained in volatile memory such as DRAM, for example, during a run-time. The index node 120 may be located one or more levels away from a data node and thus may be referred to as an internal node or, depending on the tree structure, a root node.

The layout of the index node 120 may include a page header 122 which may include, for example, metadata about the page such as the page address on a storage device, the number of keys or entries in the page, the level of the page in the mapping data structure, and/or the like. The remainder of the page may be dedicated to index entries. In some embodiments, an index node may only include single-value entries. In other embodiments, an index node may include single-value and/or multi-value entries.

A first index entry may include a key Key1 and a corresponding value Value1. A second index entry may include a key Key2 and a corresponding value Value2. A third index entry may include a key Key3 and a corresponding value Value3. Thus, the index node 120 may implement a one-to-one mapping. In other embodiments, an index node may implement a one-to-many mapping and/or a combination of one-to-one and one-to-many mapping.

In some embodiments, each index entry may correspond (map) to another index node and/or index entry, or to a data node and/or data entry. For example, the value of an index entry may point to an address in DRAM if the node or entry to which it points resides on a page that is cached in memory. As another example, the value of an index entry may point to an address in persistent storage if the node or entry to which it points resides in persistent storage.

In some embodiments, if an index node resides in non-volatile memory, any index entry in that index node may point to an address in volatile memory or persistent storage, but if the index node resides in persistent memory, any index entry in that index node may only point to an address in persistent storage. In other embodiments, an index entry in an index node may point to an address in any media, regardless of where the index node resides.

As with the embodiment illustrated in FIG. 2, the entries in the embodiment illustrated in FIG. 3 may be arranged within the page such that keys may be stored in contiguous locations in a first region 124 of the page, and values may be stored in contiguous locations in a second region 126 of the page. The first and second regions 124 and 126 may be arranged such that, as keys and values are added to the page, they advance in opposite logical directions as shown by arrows 123 and 129, respectively. Depending on the implementation details, this layout of keys and values may enable efficient traversing of the entries within the page, for example with a tree search. In some embodiments, entries within the page may be traversed with a simple binary search, hashed indexing, and/or any other search technique.

In some embodiments, hybrid nodes and/or pages may be implemented. A hybrid node and/or page may have a layout similar to a data node and/or page as described above with respect to FIG. 2, but may also accommodate index entries as described above with respect to FIG. 3. For example, a hybrid page may include single-value and/or multi-value data entries in which the values for the data entries include addresses for objects in an object store. However, a hybrid page may also include index entries in which the values may point to other index nodes and/or entries, other hybrid nodes and/or entries, and/or other data nodes and/or entries. As with data and/or index nodes and/or pages, a hybrid node and/or page may be arranged with keys and values stored in contiguous locations in separate regions, and the regions may be arranged such that, as keys and values are added to the node or page, they advance in opposite logical directions. In some embodiments, where an entry in a hybrid page has multiple values, and one of the multiple values may point to another node or entry, the first value may be used to index the other node or entry.

In some embodiments, a value for a data entry may include at least two components: an address for a corresponding object in an object store, and a check code such as a cyclical redundancy check (CRC) code. In some embodiments, a value for an index entry may include at least one component: an address or pointer to an index or data node and/or page in volatile memory, persistent storage, and/or any other location. In other embodiments, a value for any entry described herein may have more or fewer components.

Figure 4:
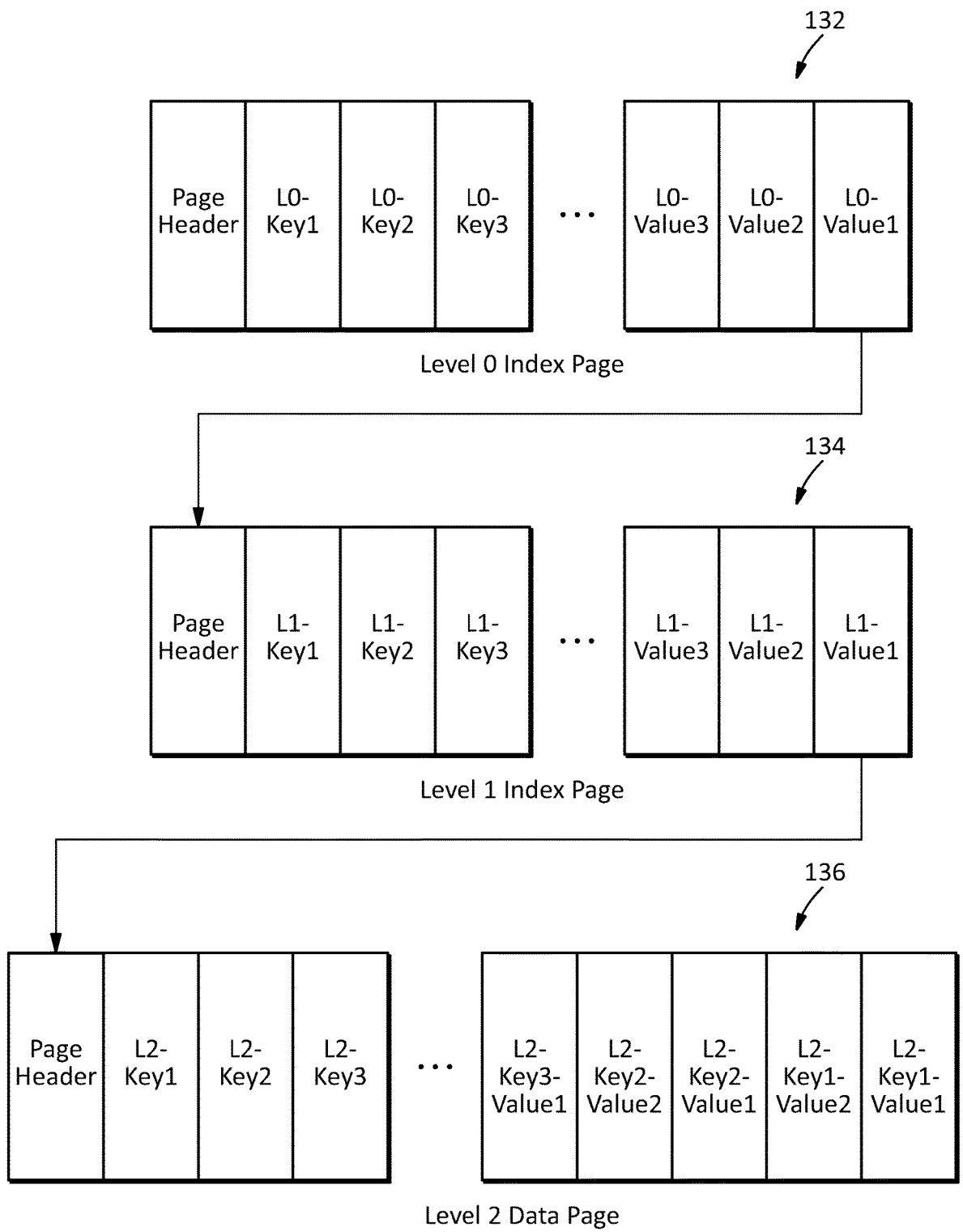
FIG. 4 illustrates an example embodiment of traversal operation through a mapping data structure for an object store according to this disclosure.

FIG. 4 illustrates an example embodiment of traversal operation through a mapping data structure for an object store according to this disclosure. In the embodiment illustrated in FIG. 4, the data structure may be implemented as a tree structure and may include a Level 0 or root level index page 132, a Level 1 index page 134, and a Level 2 data page 136.

A traversal may begin at the Level 0 (L0) or root level index page 132 and may traverse through the index page 132 to reach a Level 0 value L0-Value1 associated with a Level 0 key L0-Key1. L0-Value1 may point to the Level 1 (L1) index page 134. The traversal may continue through the L1 index page 134 to reach a Level 1 value L1-Value1 associated with a Level 1 key L1-Key1. L1-Value1 may point to the Level 2 (L2) data page 136. The traversal may continue though the L2 data page 136 and may end when it reaches Level 2 values L2-Key1-Value1 and L2-Key1-Value2 associated with a Level 2 key L2-Key1.

Figure 5:
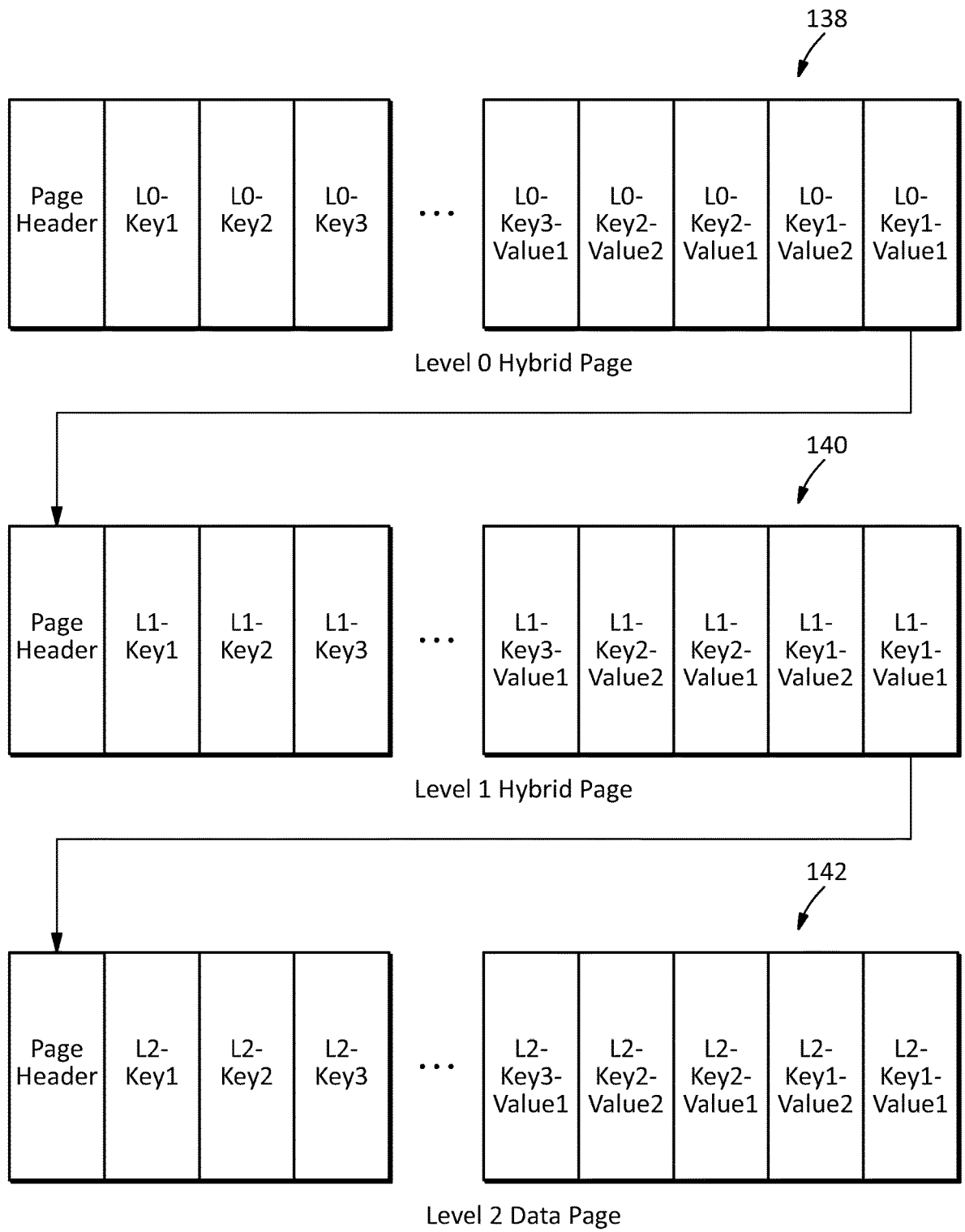
FIG. 5 illustrates another example embodiment of traversal operation through a mapping data structure for an object store according to this disclosure.

FIG. 5 illustrates another example embodiment of traversal operation through a mapping data structure for an object store according to this disclosure. In the embodiment illustrated in FIG. 5, the data structure may be implemented as a tree structure and may include a Level 0 or root level hybrid page 138, a Level 1 hybrid page 140, and a Level 2 data page 142.

A traversal may begin at the Level 0 (L0) or root level hybrid page 138 and may traverse through the hybrid page 138 to reach a Level 0 value L0-Key1-Value1 associated with a Level 0 key L0-Key1. The value L0-Key1-Value1 may point to the Level 1 (L1) hybrid page 140. The traversal may continue through the L1 hybrid page 140 to reach a Level 1 value L1-Key1-Value1 associated with a Level 1 key L1-Key1. The value L1-Key1-Value1 may point to the Level 2 (L2) data page 142. The traversal may continue though the L2 data page 142 and may end when it reaches Level 2 values L2-Key1-Value1 and L2-Key1-Value2 associated with a Level 2 key L2-Key1.

Figure 6:
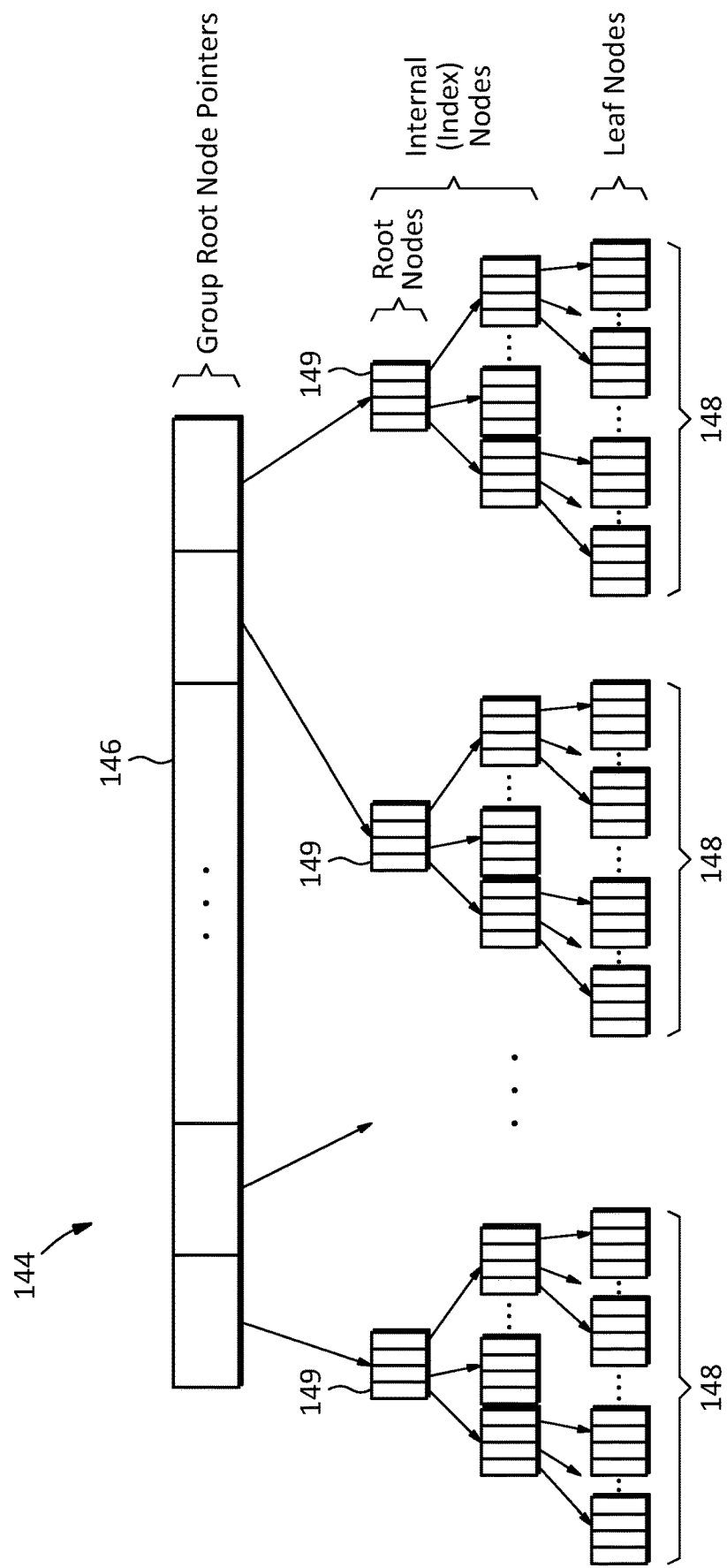
FIG. 6 illustrates another example embodiment of a mapping data structure for an object store according to this disclosure.

FIG. 6 illustrates another example embodiment of a mapping data structure for an object store according to this disclosure. The data structure 144 illustrated in FIG. 6 may be based on a tree structure such as a B–tree, B+tree, radix tree, simple binary search tree, and/or the like. The data structure 144 may by arranged in one or more groups such as placement groups (PGs). For example, a top-level mapping element may be implemented as an array 146 (e.g., a fixed array) which may include pointers to mapping tree groups 148. Each group may include any number of nodes and/or levels. For example, a group may include a root node 149 (which may be implemented, e.g., as an index node, hybrid node, etc.), any number of additional inner nodes or layers of inner nodes (which may be implemented, e.g., as index nodes, hybrid nodes, etc.) and any number of leaf nodes (which may be implemented, e.g., as data nodes).

The number and/or types of nodes, layers, groups and/or the like may change as the number and/or types of objects in the object store changes. In some embodiments, the data structure may be implemented with different data and/or search structures within groups. Each group may be implemented with any number of levels, nodes, and/or the like. Moreover, different data structures may be implemented, per store, per drive, per cluster, and/or the like.

In some embodiments, the type of data structure may be changed dynamically, for example, in response to changes in the type, arrangement, quantity, and/or the like, of objects stored in an object store. For example, in some embodiments, a data structure may initially be implemented and/or managed as a B+tree structure which may, for example, simplify tree traversal. However, depending on conditions such as how random and/or sparse key insertions are, a different structure and/or optimization may be implemented to manage space consumption, tree depth, key randomness, and/or the like.

In some embodiments, any type of queries may be supported within a mapping data structure including range queries. Queries may be supported within individual groups and/or combinations of groups, within the entire mapping data structure, and/or the like. Different data and/or search structures may be implemented for different groups, tree branches, nodes, and/or the like. In some embodiments, a B+tree may simplify tree traversal, especially, for example, in range queries.

In some embodiments, one or more additional techniques may be applied to one or more portions of a mapping data structure. For example, in some embodiments, one or more keys may be hashed into a reduced number of bits and used to traverse a leaf node, while an original key may be used to search the leaf nodes. In such an example, a reduced number of bytes may be directly indexed into a static array to reach a tree such as a B+tree for a placement group as opposed to have a single tree. Depending on the implementation details, such an arrangement may favor optimized placement group delete and/or queries within a placement group while the remainder of the tree nodes may be unaffected.

In some embodiments, page splits may be implemented based on the amount of space remaining on a leaf page, and/or page splits may be implemented based on the order of a page in a B–tree node. In some embodiments, a key and all of its values may always be stored on one page. In some embodiments, a data page size may be selected to fit all of the entries (e.g., keys and values) in the same page. In other embodiments, a certain page size may be selected, and entries may be spread among multiple pages. Where multiple values may be spread between multiple pages, data page indirection may be used with extended data pages to map the extended values. In some embodiments, it may be beneficial to implement nodes and/or pages in memory and/or persistent storage as powers of 2 (i.e., $2^N$), for example, 4K or 4096 (22) bytes.

Figure 7:
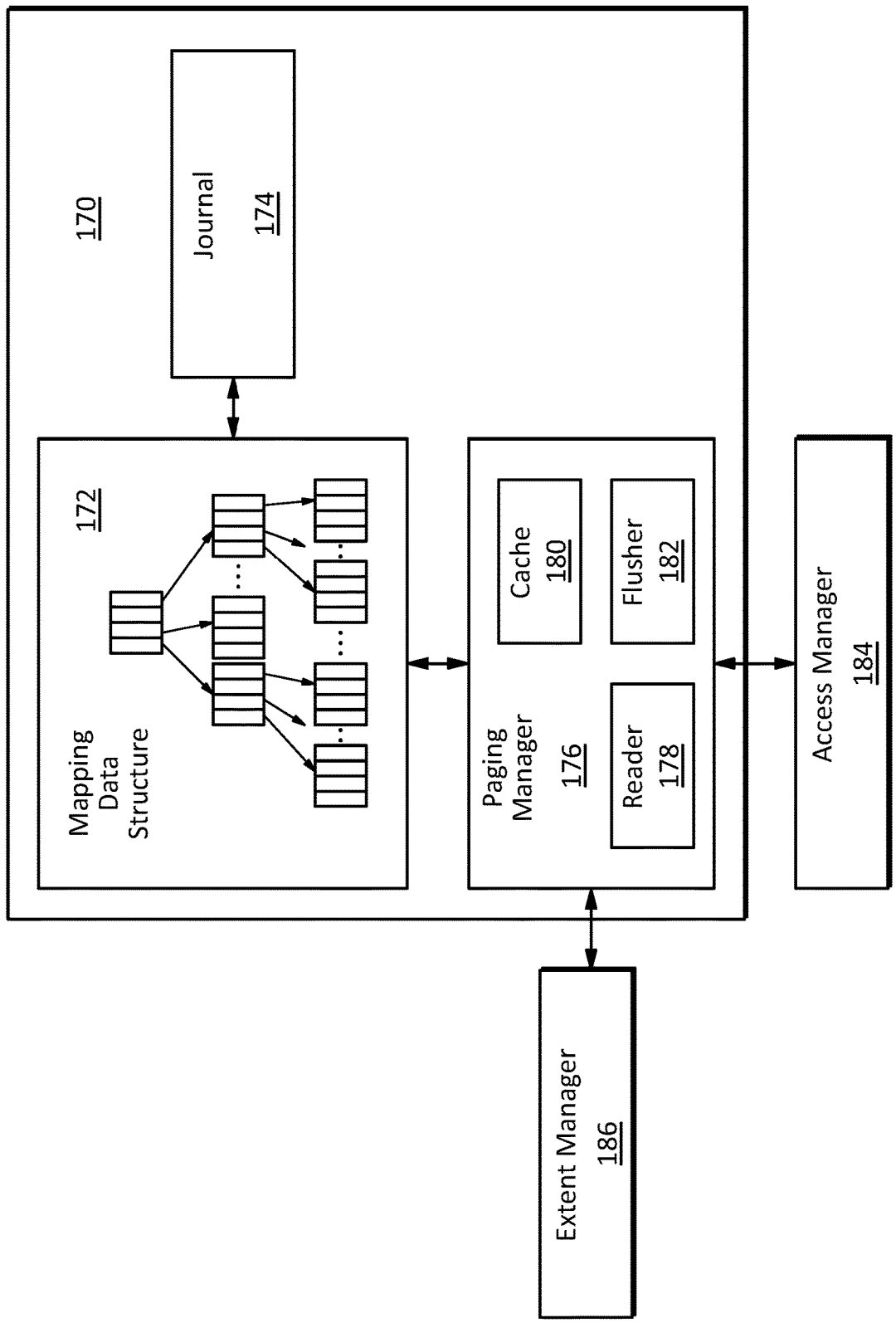
FIG. 7 illustrates an example embodiment of a system for mapping an object store according to this disclosure.

FIG. 7 illustrates an example embodiment of a system for mapping an object store according to this disclosure. The system 170 illustrated in FIG. 7 may include a mapping data structure 172, a journal 174 and a paging manger 176. The mapping data structure 172 may be implemented using any of the structures and/or techniques disclosed herein. The journal 174 may monitor run-time state and/or operations of the mapping data structure 172, for example, to preserve the state during a power cycle, power failure, and/or the like. The paging manager 176 may manage the reading, writing, caching, flushing, and/or the like of nodes, entries, etc. in pages of persistent storage, volatile memory, and/or the like. The paging manager 176 may include a reader module 178, a cache module 180 and/or a flusher module 182. The paging manager 176 may also provide an interface to access persistent storage such as SSD access manager 184, and/or an interface to an extent manager 186 which may manage areas of memory, storage, and/or the like.

In some embodiments, and depending on the implementation details, the principles of this disclosure may provide any or all of the following benefits and/or features. A mapping data structure may provide support for multi-value entries and/or objects in an object store and may provide improved or optimized layout in persistent storage (e.g., an SSD) and/or memory (e.g., DRAM) data structures. Mapping page layout may be optimized to support multiple values, where for example, keys may be packed together and values may be packed together within the page in one or more contiguous regions. Mapping page layout may be favorable for applications and/or persistent storage devices, e.g., flash memory in an SSD. Latency may be reduced for one or more operations such as get, overwrite, erase and/or range erase and/or search operations. Write amplification may be reduced. Random read and or write traffic to persistent storage devices may be reduced, and/or overall system performance may improve.

Figure 8:
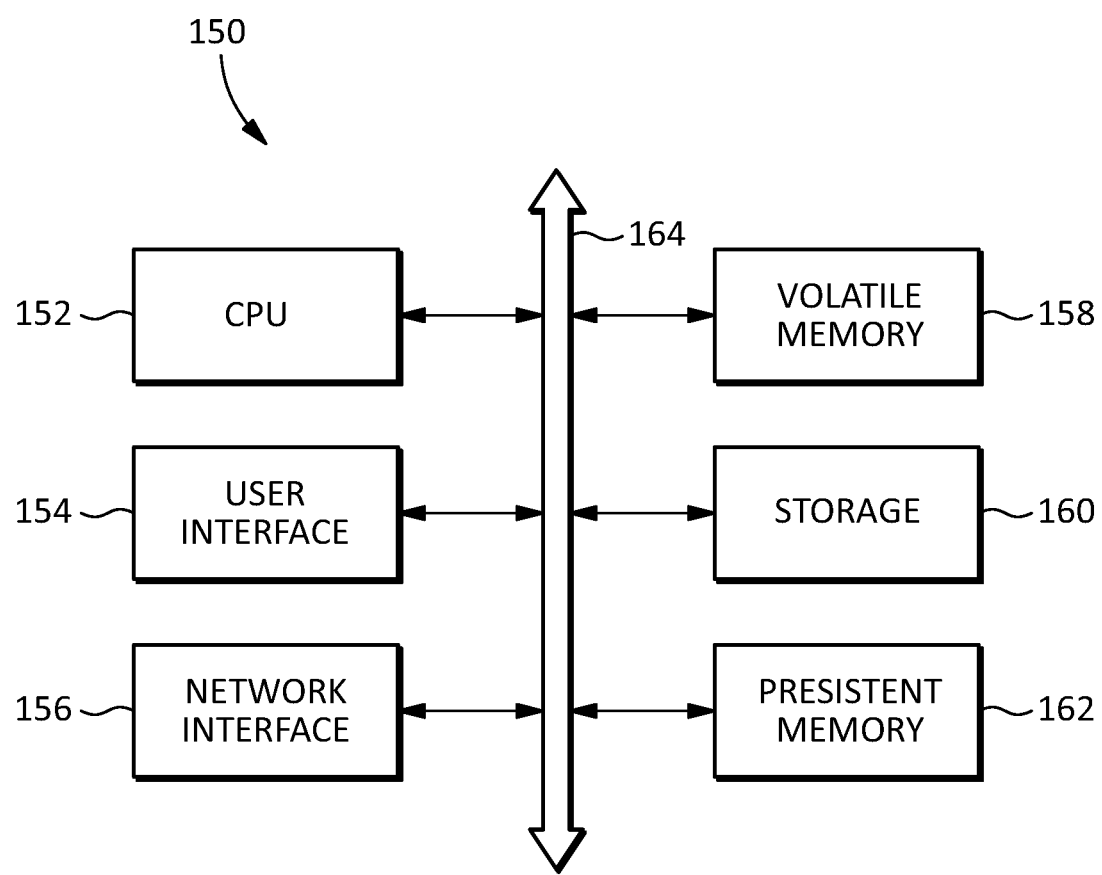
FIG. 8 illustrates an embodiment of a computing system according to this disclosure.

FIG. 8 illustrates an embodiment of a computing system according to this disclosure. The system 150 of FIG. 8 may be used to implement any or all of the methods and/or apparatus described in this disclosure. The system 150 may include a central processing unit (CPU) 152, a user interface 154, a network interface 156, volatile memory 158, storage 160, and persistent memory 162. However, the principles of this disclosure are not limited to implementation with any of the components illustrated in FIG. 8 but may be realized with any suitable hardware, software or combinations thereof. In different embodiments, the system may omit any of these components or may include duplicates, or any additional numbers of, any of the components, as well as any other types of components to implement any of the methods and/or apparatus described in this disclosure.

The CPU 152 may include any number of cores, caches, bus and/or interconnect interfaces and/or controllers. The volatile memory 158 may include any arrangement of dynamic and/or static RAM, etc. The storage 160 may include hard disk drives (HDDs), solid state drives (SSDs), and/or any other type of data storage devices or any combination thereof. The persistent memory 162 may include any type of non-volatile memory device such as non-volatile dual in-line memory module (NVDIMM), multi-layered memory, battery backed RAM, etc.

The user interface 154 may include any type of human interface devices such as keyboards, mice, monitors, video capture or transmission devices, microphones, speakers, touchscreens, etc. as well as any virtualized or remote versions of such devices. The network interface 156 may include one or more adapters or other apparatus to communicate through Ethernet, Wi-Fi, Bluetooth, or any other computer networking arrangement to enable the components to communicate through physical and/or logical networks, such as an intranet, the Internet, local area networks, wide area networks, etc.

Any or all of the components of the system 150 may be interconnected through a system bus 164 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMB), and any other types of interfaces that may enable the components to work together, either locally at one location, and/or distributed between different locations.

The system 150 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 150 to work together to implement any or all of the methods and/or apparatus described in this disclosure. Any of the components of the system 150 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The parts or steps of a method or algorithm and functions described in connection with the embodiments disclosed herein may be embodied directly in hardware, in one or more software modules executed by a processor, or in a combination of the two, including in the system 150. If implemented in software, functions may be stored or transmitted as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. Any system disclosed herein, or component or portion thereof, may be implemented as a part of a software stack of a larger system. Any system disclosed herein, or component or portion thereof, may be implemented as its own software stack.

The embodiments disclosed above have been described in the context of various implementation details, but the principles of this disclosure are not limited these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
   storing, within a mapping page, an entry for an object having first object information and second object information different from the first object information in an object store;
   wherein the entry comprises a key, a first value, and a second value;
   wherein the first value comprises first location information to determine a first location of the first object information in the object store and the second value comprises second location information to determine a second location of the second object information in the object store; and
   wherein the mapping page is stored in a physical page of persistent memory.

2. The method of claim 1, wherein:
   the entry comprises a data entry; and
   the first location information comprises an address of the first object information in the object store.

3. The method of claim 1, wherein the entry is a first entry, and wherein:
   the first entry comprises an index entry; and
   the first location information comprises a pointer to a second entry.

4. The method of claim 1, wherein the object in the object store comprises a multi-value object.

5. The method of claim 1, wherein the mapping page is stored in persistent storage.

6. The method of claim 5, wherein the mapping page is stored in volatile memory based on an operating state of the mapping page.

7. The method of claim 1, wherein the entry comprises a first entry, the object comprises a first object, and wherein:
   the method further comprises storing a second entry within the mapping page for a second object in the object store;
   the second entry comprises a key and a value for the second object in the object store; and
   the value for the second object comprises third location information to determine a location of the second object in the object store.

8. The method of claim 7, wherein:
   the key for the first object and the key for the second object are stored in contiguous locations in a first region of the mapping page; and
   the second value for the first object and the value for the second object are stored in contiguous locations in a second region of the mapping page.

9. The method of claim 8, wherein the first and second regions are arranged to advance in opposite logical directions within the mapping page based on adding one or more additional keys or one or more additional values to the mapping page.

10. The method of claim 7, wherein the first entry and the second entry are part of a mapping data structure.

11. The method of claim 10, wherein:
    the mapping data structure comprises one or more nodes; and
    at least one of the one or more nodes is stored within a mapping page.

12. The method of claim 11, wherein:
    a first one of the one or more nodes comprises a data node; and
    the data node comprises one or more of the first entry or the second entry.

13. The method of claim 12, wherein:
    a second one of the one or more nodes comprises an index node;
    the index node comprises an index entry; and
    the index entry comprises a key and a value, wherein the value of the index entry points to the data node.

14. The method of claim 11, wherein:
    a first one of the one or more nodes comprises a hybrid node; and
    the hybrid node comprises a data entry for a corresponding object in the object store.

15. The method of claim 10, further comprising traversing the mapping data structure to access a data entry for a corresponding object in the object store.

16. A method comprising:
    maintaining a mapping data structure comprising one or more key-value entries;
    wherein a first one of the one or more key-value entries comprises a key, a first value, and a second value;
    wherein the first value and the second value include information to determine a first location and a second location of first object information and second object information, respectively, in an object store, the second object information being different from the first object information;
    wherein the first one of the one or more key-value entries is stored within a mapping page of the mapping data structure; and
    wherein the mapping page is stored in a physical page of persistent memory.

17. The method of claim 16, wherein:
    the mapping data structure comprises a tree structure having one or more nodes; and
    a first one of the one or more nodes is stored within the mapping page.

18. The method of claim 17, wherein the key is a first key, and the mapping page is a first mapping page, and wherein:
    a second one of the one or more key-value entries comprises an index entry;
    the index entry comprises a second key and a third value; and
    the third value points to a second mapping page of the mapping data structure.

19. A system comprising:
    at least one processor configured to store, within a mapping page, an entry for an object having first object information and second object information different from the first object information in an object store;
    wherein the entry comprises a key, a first value, and a second value;
    wherein the first value and the second value include information to determine a first location and a second location of the first object information and the second object information, respectively, in the object store; and
    wherein the mapping page is stored in a physical page of persistent memory.

20. The system of claim 19, wherein the at least one processor is configured to control an access of the mapping page.

* * * * *